United States Patent
Van Phan et al.

(10) Patent No.: US 12,177,694 B2
(45) Date of Patent: Dec. 24, 2024

(54) QoS MONITORING FOR UNICAST/GROUPCAST OVER SIDELINK COMMUNICATION

(71) Applicant: Nokia Technologies Oy, Espoo (FI)

(72) Inventors: Vinh Van Phan, Oulu (FI); Ling Yu, Kauniainen (FI); Hajo Bakker, Eberdingen (DE); Rudraksh Shrivastava, Erligheim (DE); Oliver Blume, Stuttgart (DE); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 449 days.

(21) Appl. No.: 17/630,379

(22) PCT Filed: Aug. 7, 2019

(86) PCT No.: PCT/EP2019/071181
§ 371 (c)(1),
(2) Date: Jan. 26, 2022

(87) PCT Pub. No.: WO2021/023380
PCT Pub. Date: Feb. 11, 2021

(65) Prior Publication Data
US 2022/0286876 A1 Sep. 8, 2022

(51) Int. Cl.
*H04W 24/04* (2009.01)
*H04W 24/10* (2009.01)
*H04W 92/18* (2009.01)

(52) U.S. Cl.
CPC .......... *H04W 24/04* (2013.01); *H04W 24/10* (2013.01); *H04W 92/18* (2013.01)

(58) Field of Classification Search
CPC ..... H04W 24/04; H04W 24/10; H04W 92/18; H04W 84/005; H04W 84/047; H04W 88/04
See application file for complete search history.

(56) References Cited

U.S. PATENT DOCUMENTS

| 2002/0131363 | A1* | 9/2002 | Beshai | ................... H04L 47/24 370/230 |
| 2010/0189046 | A1* | 7/2010 | Baker | ................... H04L 5/0091 370/336 |

(Continued)

OTHER PUBLICATIONS

"QoS monitoring and reporting for NR Sidelink V2X Communications", 3GPP TSG-RAN WG2#106, R2-1907420, Agenda: 11.4.6, Huawei, May 13-17, 2019, 4 pages.

(Continued)

*Primary Examiner* — The Hy Nguyen
*Assistant Examiner* — Jesse P. Samluk
(74) *Attorney, Agent, or Firm* — Robert P. Michal, Esq.; Carter, DeLuca & Farrell LLP (57) ABSTRACT

There are provided measures for enabling/realizing flexible and adaptive QoS monitoring for unicast/groupcast over sidelink communication, which may preferably be capable of enhancing support of unicast/groupcast services over sidelink communication. Such measures exemplarily comprise obtaining a request for QoS monitoring for unicast/groupcast over sidelink communication with a specified quality-of-service profile, which indicates at least one target QoS metric to be monitored, determining a QoS monitoring procedure, wherein a scheme for enforcing QoS monitoring over sidelink communication in collaboration with at least one unicast/groupcast receiving-side device is decided, and performing the QoS monitoring procedure, wherein QoS monitoring messages are exchanged with the at least one unicast/groupcast receiving-side device over the sidelink (Continued)

communication with the specified QoS profile in accordance with the decided scheme and the at least one target quality-of-service metric is derived based thereon.

1 Claim, 6 Drawing Sheets

(56) References Cited

U.S. PATENT DOCUMENTS

| | | | | |
|---|---|---|---|---|
| 2014/0219114 | A1* | 8/2014 | Vasseur | H04L 43/10 370/252 |
| 2018/0213379 | A1* | 7/2018 | Xiong | H04W 4/70 |
| 2021/0345356 | A1* | 11/2021 | Fan | H04W 72/543 |
| 2022/0014973 | A1* | 1/2022 | Perras | H04L 1/0017 |
| 2022/0132603 | A1* | 4/2022 | Adjakple | H04W 8/005 |

OTHER PUBLICATIONS

"New WID on 5G V2X with NR sidelink", 3GPP TSG RAN Meeting #83, RP-190766, Agenda: 9.1.1, LG Electronics, Mar. 18-21, 2019, 8 pages.
"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.2.0, Jun. 2019, pp. 1-93.
"Discussion on QoS management for NR V2X", 3GPP TSG-RAN WG2 Meeting #106, R2-1906139, Agenda: 11.4.6, Lenovo, May 13-17, 2019, pp. 1-3.
"3rd Generation Partnership Project; Technical Specification Group Services and System Aspects; Study on architecture enhancements for the Evolved Packet System (EPS) and the 5G System (5GS) to support advanced V2X services (Release 16)", 3GPP TR 23.786, V16.1.0, Jun. 2019, pp. 1-119.
"3rd Generation Partnership Project; Technical Specification Group Services and System Aspects; Study on application layer support for V2X services; (Release 16)", 3GPP TR 23.795, V16.1.0, Dec. 2018, pp. 1-77.
International Search Report and Written Opinion received for corresponding Patent Cooperation Treaty Application No. PCT/EP2019/071181, dated Apr. 15, 2020, 15 pages.
"Key Issue on PC5 QoS aspects", 3GPP TSG-SA WG6 Meeting #32, S6-191581, Agenda: 11.6, Huawei, Jul. 8-12, 2019, 4 pages.
"Unicast-assisted groupcast transmissions", 3GPP TSG-RAN WG2 #106, R2-1907208, Agenda: 11.4.4, LG Electronics Inc, May 13-17, 2019, 2 pages.
"TS 23.287 Clarification on PC5 QoS rule", SA WG2 Meeting #134, S2-1908215, Agenda: 6.6.1, LG Electronics, Jun. 24-28, 2019, 11 pages.
"Network Based Monitoring and Reporting of QoS parameters for NR V2X Sidelink", 3GPP TSG-RAN WG2 Meeting #107, R2-1909284, Agenda: 11.4.6, Nokia, Aug. 26-30, 2019, 4 pages.
"Huawei's views on 3GPP NR V2X work" 5GAA 10th Working Group 4 Meeting S-190076 Berlin, Germany, May 20-22, 2019.

* cited by examiner

QoS MONITORING FOR UNICAST/GROUPCAST OVER SIDELINK COMMUNICATION

RELATED APPLICATION

This application was originally filed as PCT Application No. PCT/EP2019/071181, filed on Aug. 7, 2019, of which is incorporated herein by reference in its entirety.

FIELD

The present disclosure relates to QoS monitoring for unicast/groupcast over sidelink communication. More specifically, the present disclosure relates to measures/mechanisms (including methods, apparatuses (i.e. devices and/or functions) and computer program products) for enabling/realizing QoS monitoring for unicast/groupcast over sidelink communication, which may preferably be capable of enhancing support of unicast/groupcast services over sidelink communication.

BACKGROUND

Basically, the present disclosure addresses sidelink communication and support of services over sidelink communication in mobile communication systems. As an example, the present disclosure is applicable in a 3GPP-standardized communication system, such as a 5G/NR or a 4G/LTE/eLTE system.

Herein, sidelink (communication) refers to (communication via) an interface between terminal devices in a mobile communication system, which may be referred to by SL or PC5. Accordingly, sidelink facilitates direct device-to-device communication, e.g. direct communication between local UEs or a local UE and other communication-enabled device(s) such as roadside unit(s), which are involved in or impacted by certain applications and/or services, without (data plane) participation of a base station or serving network entity (which may for example have a downlink/uplink to one of the UEs via the Uu interface). This means that there may be participation of a base station or serving network entity in the control or management plane, but the data transfer does not run via downlink/uplink from/to a base station or serving network entity, i.e. via the Uu interface. A benefit of direct communication is that data transmission involves less hops and can thus be faster and that data occupies radio resources only once on sidelink instead of twice (i.e. downlink and uplink) over the Uu interface.

Sidelink (communication) is used by/for various services in mobile communication systems. For example, V2X services or URLLC services over sidelink communication are being developed and need to be supported accordingly.

For providing enhanced services (which may include any enhancement beyond mere sidelink broadcast, such as e.g. sidelink unicast or groupcast, monitoring of reception of sent data, or the like) or enhancing support of services over sidelink, it is important to collect feedback and measurement information not only on the device-network interface (e.g. Uu) but also on the device-device interface (i.e. SL or PC5). Accordingly, there is a need for facilitating monitoring and reporting of certain network situations, metrics such as KPIs and/or potential/predicated changes thereof, so as to enable corresponding adjustments or re-/configurations of the services based thereon. Specifically, it is desirable to facilitate monitoring and reporting of deliverable QoS level(s) related to targeted application(s) and service(s) or service class(es) of V2X or the like, such as (I)IoT.

Such monitoring of QoS level of individual SL connections/services can be used to take action to maintain the QoS level required by targeted application(s) and service(s) or service class(es). In this regard, it is to be noted that overall SL performance exhibits interdependency between individual SL connections/services in a local area. For optimization of communication performance over sidelink, there is a need for aggregated or correlated QoS monitoring (i.e. collection of feedback and measurement information), which may be referred to as (sidelink) QoS monitoring.

While sidelink in LTE is based on broadcast without feedback control on radio-access level (L1/L2), sidelink in 5G/NR is enhanced to include options with feedback control on radio-access level (L1/L2) for support of unicast/groupcast applications and services with demanding QoS requirements, e.g. V2X, URLLC or the like. Accordingly, for sidelink in 5G/NR, there is a need for facilitating (sidelink) QoS monitoring for unicast/groupcast applications and services.

However, QoS monitoring for sidelink (communication) is not trivial from the serving network perspective, as data transmissions over SL are not routed through the serving network. Further, QoS on SL is not a characteristic of a single UE but (e.g. link quality) can be very different for the set of SL connections of one UE (e.g. depending on the relative position to the connected peer UEs). Still further, the connections on SL can stretch across cell borders and are thus not clearly associated to one particular base station. Hence, the base station or serving network entity (which may for example have a downlink/uplink to one of the UEs via the Uu interface) cannot (always) be aware of the necessary information in terms of overall SL performance In view thereof, conventional approaches for QoS monitoring on the device-network interface (e.g. Uu) are not feasible or sufficient in this regard, namely for providing enhanced services or enhancing support of services over sidelink.

Therefore, there is a desire for measures/mechanisms for (enabling/realizing) QoS monitoring for unicast/groupcast over sidelink communication, which may preferably be capable of enhancing support of unicast/groupcast services over sidelink communication.

SUMMARY

Various exemplifying embodiments of the present disclosure aim at addressing at least part of the above issues and/or problems and drawbacks.

Various aspects of exemplifying embodiments of the present disclosure are set out in the appended claims.

According to an example aspect of the present disclosure, there is provided a method, comprising:

obtaining a request for quality-of-service monitoring for unicast/groupcast over sidelink communication with a specified quality-of-service profile, which indicates at least one target quality-of-service metric to be monitored, determining a quality-of-service monitoring procedure on the basis of the obtained request in view of presence or absence and/or quality-of-service profile of an ongoing unicast/groupcast receiving service, wherein a scheme for enforcing quality-of-service monitoring over sidelink communication in collaboration with at least one unicast/groupcast receiving-side device is decided, and performing the determined quality-of-service monitoring procedure, wherein quality-of-service monitoring messages are exchanged with the at least one unicast/groupcast receiving-side device over the sidelink communication with the specified quality-of-service profile in accordance with the decided scheme and the at least one target quality-of-service metric is derived based on the message exchange.

According to an example aspect of the present disclosure, there is provided an apparatus comprising at least one processor and at least one memory including a computer program code, wherein the at least one memory and the computer program code are configured, with the at least one processor, to cause the apparatus to perform at least the following:

obtaining a request for quality-of-service monitoring for unicast/groupcast over sidelink communication with a specified quality-of-service profile, which indicates at least one target quality-of-service metric to be monitored, determining a quality-of-service monitoring procedure on the basis of the obtained request in view of presence or absence and/or quality-of-service profile of an ongoing unicast/groupcast service, wherein a scheme for enforcing quality-of-service monitoring over sidelink communication in collaboration with at least one unicast/groupcast receiving-side device is decided, and performing the determined quality-of-service monitoring procedure, wherein quality-of-service monitoring messages are exchanged with the at least one unicast/groupcast receiving-side device over the sidelink communication with the specified quality-of-service profile in accordance with the decided scheme and the at least one target quality-of-service metric is derived based on the message exchange.

According to an example aspect of the present disclosure, there is provided an apparatus comprising:

means for obtaining a request for quality-of-service monitoring for unicast/groupcast over sidelink communication with a specified quality-of-service profile, which indicates at least one target quality-of-service metric to be monitored, means for determining a quality-of-service monitoring procedure on the basis of the obtained request in view of presence or absence and/or quality-of-service profile of an ongoing unicast/groupcast service, wherein a scheme for enforcing quality-of-service monitoring over sidelink communication in collaboration with at least one unicast/groupcast receiving-side device is decided, and means for performing the determined quality-of-service monitoring procedure, wherein quality-of-service monitoring messages are exchanged with the at least one unicast/groupcast receiving-side device over the sidelink communication with the specified quality-of-service profile in accordance with the decided scheme and the at least one target quality-of-service metric is derived based on the message exchange.

According to various developments/modifications, any one of the aforementioned method-related and/or apparatus-related example aspects of the present disclosure may include one or more of the following features:

as at least part of the scheme, it may be decided whether the determined quality-of-service monitoring procedure is coupled with or decoupled from actual unicast/groupcast data over sidelink communication, the quality-of-service monitoring messages may be exchanged using a traffic pattern of the actual unicast/groupcast data, if coupling is decided, the quality-of-service monitoring messages may be exchanged using a traffic pattern based on a configuration in the request, if decoupling is decided, as at least part of the scheme, it may be decided whether the determined quality-of-service monitoring procedure is performed in a connection-oriented or connectionless manner, the determining may comprise deciding whether or not a setup operation is required for exchanging the quality-of-service monitoring messages, and initiating the setup operation, if the setup operation is decided to be required, the determining may comprise detecting presence of an ongoing unicast/groupcast service with a quality-of-service profile different from the specified quality-of-service profile, and initiating a setup operation for at least one quality-of-service flow and/or at least one radio bearer service enabling message exchange with the specified quality-of-service profile utilizing sidelink communication of the ongoing unicast/groupcast service, wherein the quality-of-service monitoring messages are exchanged via the at least one quality-of-service flow and/or the at least one radio bearer service resulting from the initiated setup operation, the determining may comprise detecting presence of an ongoing unicast/groupcast service with the specified quality-of-service profile, wherein the quality-of-service monitoring messages are exchanged via a connection of the ongoing unicast/groupcast service, the determining may comprise detecting absence of an ongoing unicast/groupcast service, and deciding whether or not a setup operation is required for exchanging the quality-of-service monitoring messages, if the setup operation is decided to be required, the determining may comprise initiating a setup operation for a connection enabling message exchange with the specified quality-of-service profile, wherein the quality-of-service monitoring messages are exchanged via the connection resulting from the initiated setup operation, if the setup operation is decided to be not required, the quality-of-service monitoring messages may be exchanged in a connectionless manner, the setup operation may be for setting up the connection with the at least one unicast/groupcast receiving-side device in accordance with at least one quality-of-service flow and/or at least one radio bearer service based on the request, the request may include a configuration of at least one quality-of-service flow and/or at least one radio bearer service for the requested quality-of-service monitoring over sidelink communication, the request may include a resource allocation for the requested quality-of-service monitoring over sidelink communication, the resource allocation may comprise an indication of resources for exchanging the quality-of-service monitoring messages, including either resources for transmitting quality-of-service monitoring request messages to the at least one unicast/groupcast receiving-side device or resources for transmitting quality-of-service monitoring request messages to the at least one unicast/groupcast receiving-side device and resources for transmitting quality-of-service monitoring response messages from the at least one unicast/groupcast receiving-side device, the resource allocation may comprise an indication of a resource allocation mode to be used for allocating resources for exchanging the quality-of-service monitoring messages, the performing may comprise generating and transmitting quality-of-service monitoring request messages to the at least one unicast/groupcast receiving-side device, which include an indication about the requested quality-of-service monitoring, receiving quality-of-service monitoring response messages from the at least one unicast/groupcast receiving-side device, and deriving the at least one target quality-of-service metric from transmitting/receiving information and/or properties of the quality-of-service monitoring request and response messages, the request may be received from a serving network entity or an application layer or function, the derived at least one target quality-of-service metric may be reported to the serving network entity or the application layer or function, the quality-of-service monitoring messages may comprise messages and/or packets based on L1 and/or L2 and/or L3 signaling, the quality-of-service monitoring messages may comprise request and response messages and/or packets in the form of PDCP control packet data units sent on sidelink data radio bearer to and from the at least one unicast/groupcast receiving-side device, the quality-of-service monitoring messages may comprise request and response messages and/or packets in the form of sidelink signaling protocol messages and/or packets to and from the at least one unicast/groupcast receiving-side device, the quality-of-service monitoring messages may comprise request and response messages and/or packets in the form of sidelink radio resource control signaling messages and/or packets to and from the at least one unicast/groupcast receiving-side device, the quality-of-service monitoring messages may comprise request and response messages and/or packets in the form of enhanced sidelink control information sent on the Physical Sidelink Control Channel to and from the at least one unicast/groupcast receiving-side device, the quality-of-service monitoring messages may comprise request messages and/or packets in the form of enhanced sidelink control information on the Physical Sidelink Control Channel to the at least one unicast/groupcast receiving-side device and response messages and/or packets in the form of an acknowledgment on the Physical Sidelink Feedback Channel, the quality-of-service monitoring messages may comprise request and response messages and/or packets based on Automatic Repeat Request or Hybrid Automatic Repeat Request, as at least part of the scheme, it may be decided about the signaling and/or message/packet type for the quality-of-service monitoring messages based on one or more of the at least one target quality-of-service metric, a channel busy ratio of sidelink communication, service and/or quality-of-service demands, de-/coupling of the quality-of-service monitoring procedure with actual unicast/groupcast data over sidelink communication, or the like, the method may be operable at or by a terminal device, the apparatus may be operable as or at a terminal entity, the unicast/groupcast over sidelink communication may relate to a V2X service and/or Ultra Reliable Low Latency Communication.

According to an example aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to the aforementioned method-related example aspect of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, QoS monitoring for unicast/groupcast over sidelink communication, which may preferably be capable of enhancing support of unicast/groupcast services over sidelink communication, can be enabled/realized.

BRIEF DESCRIPTION OF THE DRAWINGS

In the following, the present disclosure will be described in greater detail by way of non-limiting examples with reference to the accompanying drawings, in which.

DETAILED DESCRIPTION

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples for certain exemplifying network configurations and system deployments. Namely, the following description mainly refers to 3GPP standards, specially referring to 5G/NR standardization as well as 4G/LTE/eLTE standardization, being used as non-limiting examples. As such, the description of exemplifying embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or exemplifying embodiments described herein are applicable to it.

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present disclosure, in general terms, there are provided measures/mechanisms (including methods, apparatuses (i.e. devices and/or functions) and computer program products) for enabling/realizing QoS monitoring for unicast/groupcast over sidelink communication, which may preferably be capable of enhancing support of unicast/groupcast services over sidelink communication.

Herein, unicast refers to a link (such as a communication, transmission, connection or service) from a transmitting-side device to single receiving-side device, and groupcast (as a form or example of multicast) refers to a link (such as a communication, transmission, connection or service) from a transmitting-side device to one or more receiving-side devices belonging to the same group (e.g. involved in or impacted by certain applications and services). Any references to unicast/groupcast are intended to encompass one or more unicast and/or groupcast links, as the case may be.

Figure 1:
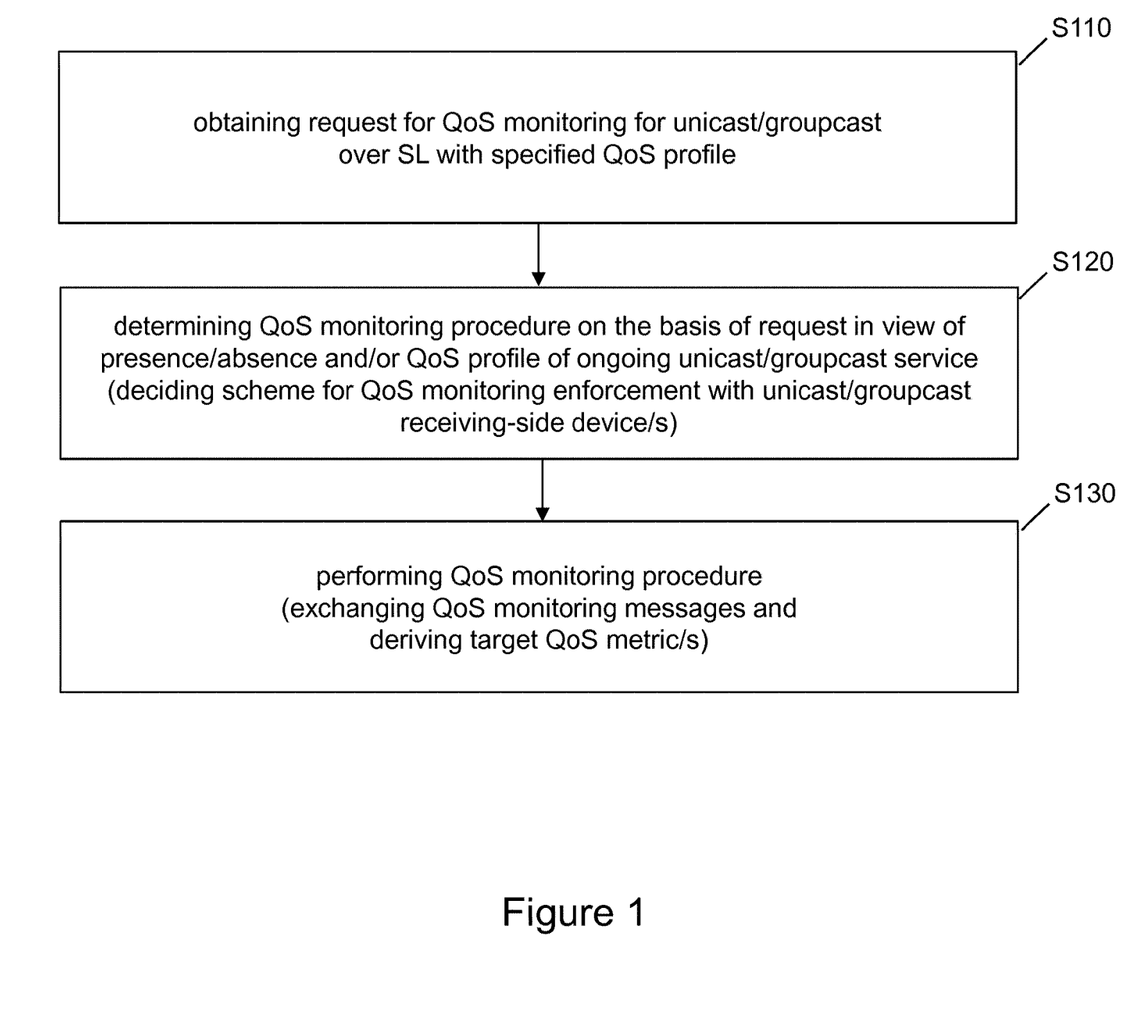
FIG. 1 shows a flowchart illustrating an example of a method according to at least one exemplifying embodiment.

FIG. 1 shows a flowchart illustrating an example of a method according to at least one exemplifying embodiment. The method of FIG. 1 is operable at or by a terminal device (e.g. a mobile device) in/of a mobile communication system, which will hereinafter exemplarily be referred to as Tx UE (which represents a unicast/groupcast transmitting-side device).

As shown in FIG. 1, a method according to at least one exemplifying embodiment comprises an operation (S110) of obtaining a request (e.g. referred to as request for (sidelink) QoS monitoring), which is a request for QoS monitoring for unicast/groupcast over sidelink communication (SL) with a specified QoS profile, an operation (S120) of determining a QoS monitoring procedure on the basis of the obtained request in view of presence or absence and/or QoS profile of an ongoing unicast/groupcast service (of the Tx UE), and an operation (S130) of performing the determined QoS monitoring procedure.

In this method, the request in operation S110 can originate from any conceivable source which is capable of initiating such request, depending on the network scenario and/or mode, applicable use case, or the like. That is to say, the technique according to the present disclosure generally is or operates independent of the source of the request for (sidelink) QoS monitoring. In an example (which is detailed below with reference to FIGS. 2 and 3), the request can originate from a network management function in the network (such as a serving network entity, e.g. gNB, or any controlling network entity) and received at the Tx UE via the Uu interface. In another example, the request can originate from an application layer or function in/of the Tx UE itself (which is feasible, when the sidelink is operated independent from the network (e.g. in LTE mode 4 or 5G mode 2)).

In this method, the request in operation S110 shall indicate at least one target QoS metric to be monitored (such as e.g. KPI/s), the QoS monitoring procedure determination in operation S120 shall include deciding a scheme for enforcing QoS monitoring over sidelink communication (SL) in collaboration with at least one unicast/groupcast receiving-side device (i.e. one or more Rx UEs), and the execution of the determined QoS monitoring procedure in operation S130 shall include exchanging QoS monitoring messages with the at least one unicast/groupcast receiving-side device (i.e. one or more Rx UEs) over the sidelink communication (SL) with the specified QoS profile in accordance with the decided scheme and deriving the at least one target QoS metric (such as e.g. KPI/s) based on the message exchange.

Thereby, (sidelink) QoS monitoring for unicast/groupcast applications and/or services can be facilitated in a flexible and adaptive (or optimized) manner so as to provide for enhanced services (which may include any enhancement beyond mere sidelink broadcast, such as e.g. sidelink unicast or groupcast, monitoring of reception of sent data, or the like) or enhance support of services over sidelink, such as e.g. V2X or URLLC in 5G/NR systems.

Generally, various QoS metrics or KPIs (either alone or in any set or combination) can be considered for QoS monitoring as appropriate in view of applicable requirements, conditions, use cases, or the like. For example, applicable QoS metrics or KPIs may include any (one or more) E2E-related and/or non-E2E-related parameters. For E2E-related parameters, latency, reliability, availability and variations thereof can be exemplarily mentioned. For non-E2E-related parameters, PER, delay, throughput, range and variations thereof can be exemplarily mentioned. By way of a suitable QoS metric or KPI (set/combination), overall QoS monitoring behavior and performance (such as the prediction of potential QoS changes) can be appropriately adjusted.

Further, QoS monitoring related configuration(s) and/or parameter(s) to be monitored and measured may consider different triggers, monitoring time intervals, value ranges or targets, or the like. Also, different procedures are applicable, such as e.g. averaging, filtering, or the like.

Figure 2:
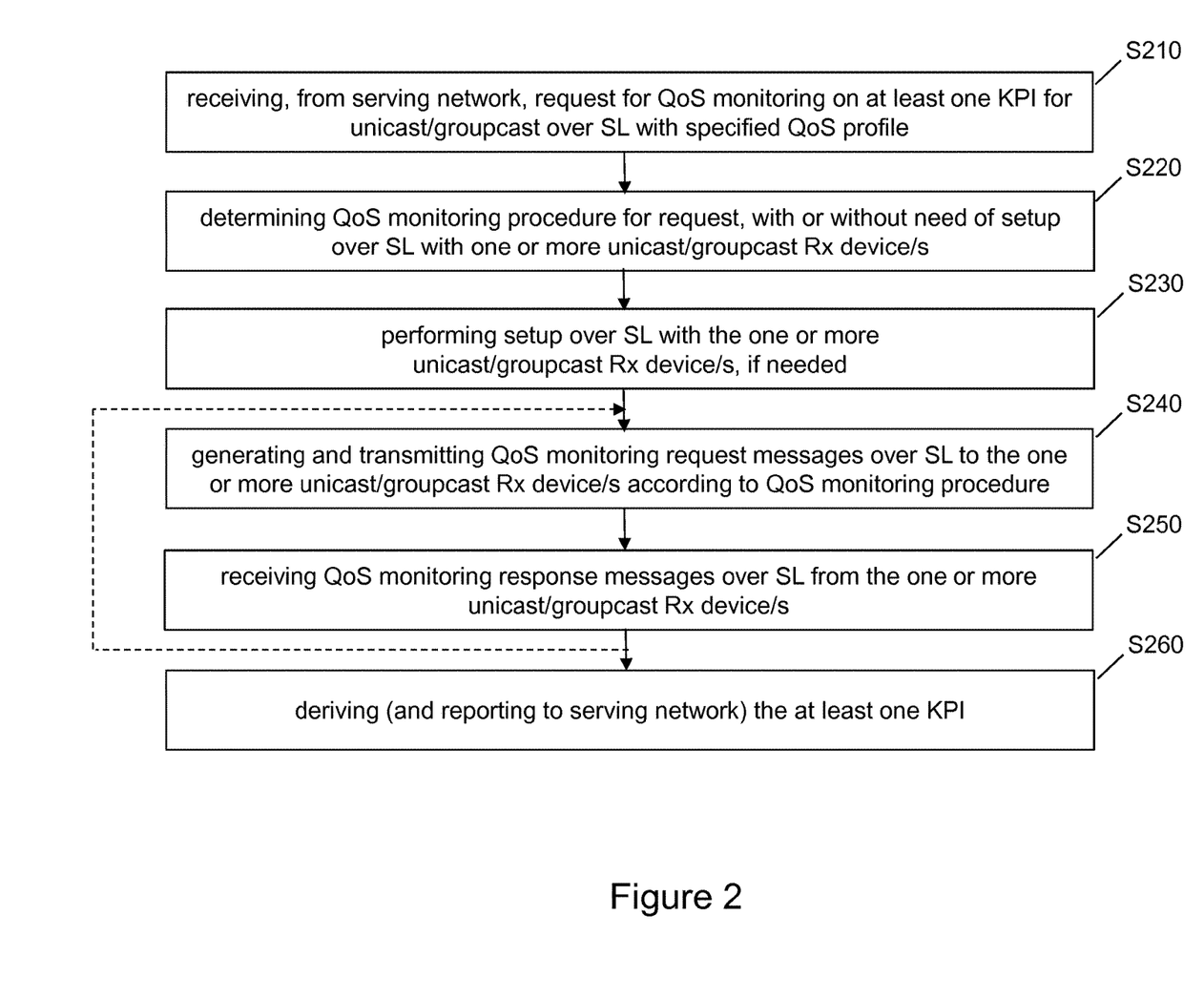
FIG. 2 shows a flowchart illustrating another example of a method according to at least one exemplifying embodiment.
Figure 3:
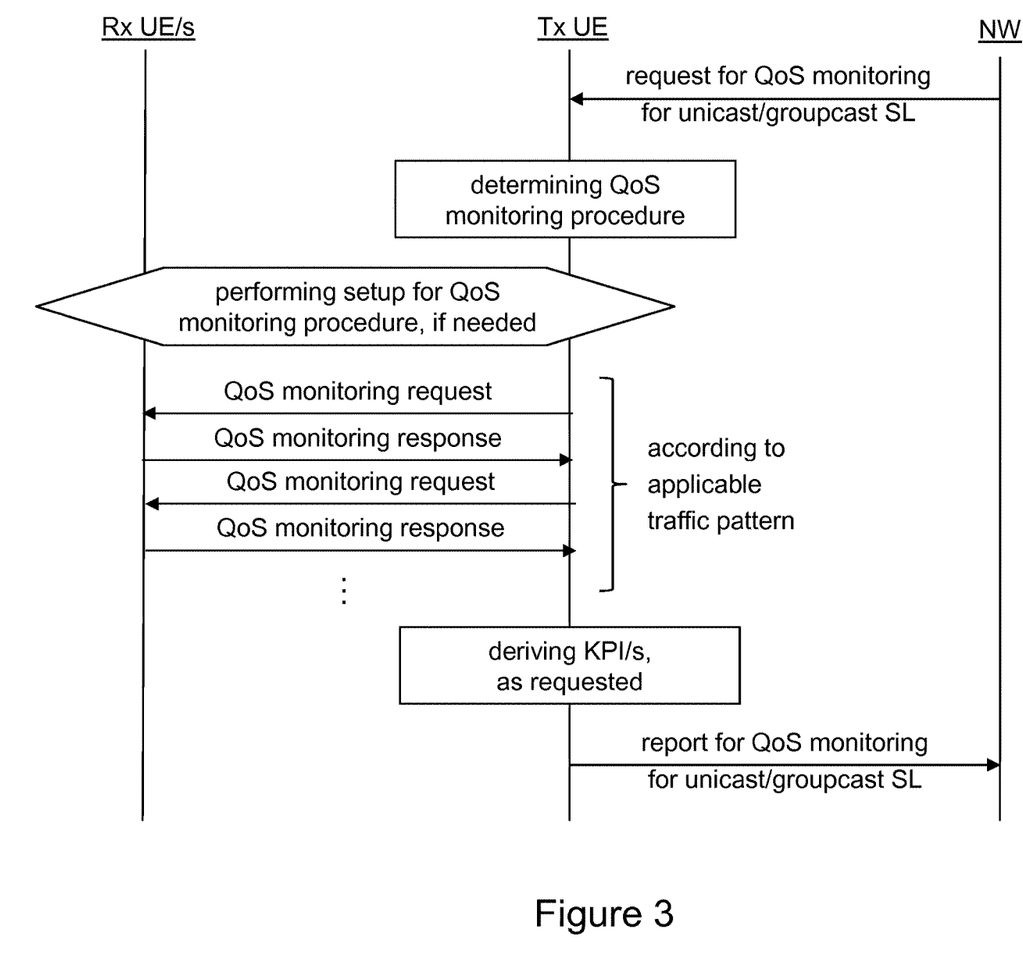
FIG. 3 shows a diagram illustrating an example of a sequence according to at least one exemplifying embodiment.

With reference to FIGS. 2 and 3, QoS monitoring for unicast/groupcast over sidelink communication according to at least one exemplifying embodiment is explained, by way of example, in further detail.

In this example, it is assumed—by way of example and ease of description—that the request for (sidelink) QoS monitoring is issued by a serving network entity, e.g. gNB, representing an example of a network management function in the network. Irrespective thereof, as mentioned above, the request for (sidelink) QoS monitoring may be issued by any conceivable source, e.g. an application layer or function in/of the Tx UE itself (wherein, in this example, the following description applies accordingly when any reference to "serving network entity" or "serving network" in the following description is replaced with "application (layer/function) [of the Tx UE]").

FIG. 2 shows a flowchart illustrating another example of a method according to at least one exemplifying embodiment, which is operable at or by a Tx UE (which represents a unicast/groupcast transmitting-side device), and FIG. 3 shows a diagram illustrating an example of a sequence according to at least one exemplifying embodiment, which is illustrated from a system perspective. In FIG. 3, Tx UE represents the terminal device performing the method as illustrated in FIG. 2, NW represents a serving network entity such as a base station (having a device-network interface, such as a Uu interface, with the Tx UE), and Rx UE/s represents one or more unicast/groupcast receiving-side devices (of the unicast/groupcast link or links originating from the Tx UE).

Initially, the serving network entity (e.g. gNB) selects or controls selection of a terminal device as the Tx UE to perform QoS monitoring for unicast/groupcast over SL. Such selection may be based on various issues, such as e.g. the monitoring object (e.g. relevant application or service), desired (service) area for monitoring, or the like. Depending on whether or not the selected Tx UE has an ongoing SL unicast/groupcast (with the appropriate QoS profile as targeted for monitoring) when being selected or requested for (sidelink) QoS monitoring, an existing connection is used or a corresponding connection is set up, as described in more detail below. Accordingly, the serving network entity does not necessarily have to have knowledge about (the presence/absence or property of) a unicast/groupcast connection at the TX UE when selecting the Tx UE for (sidelink) QoS monitoring. Irrespective thereof, the serving network entity may have such knowledge in mode 1/3, namely from a link setup and resource request, or may be informed accordingly in LTE mode 2/4 where the TX UE may start SL unicast/groupcast without network involvement.

It is to be noted that the description herein is made with reference to a single selected terminal device (Tx UE), but the overall QoS monitoring procedure may involve (corresponding actions of or with respect to) a plurality of terminal devices (Tx UEs). That is, as the case may be, the serving network entity may select two or more UEs as Tx UEs, these Tx UEs individually perform and control corresponding actions based on their respective requests, and the serving network entity merges the QoS monitoring results from these Tx UEs based on their reports.

Generally, the (sidelink) QoS monitoring (or, more specifically, request thereof) can be decided or triggered at various places.

In an example, the (sidelink) QoS monitoring can be triggered (externally or remotely) at/by the network. In this case, a controlling entity such as a serving network entity, e.g. gNB, can decide to perform and thus trigger (sidelink) QoS monitoring. Alternatively, an application server in the network can decide to perform and thus trigger (sidelink) QoS monitoring via a controlling entity such as a serving network entity, e.g. gNB, using e.g. AF (Application Function) and corresponding interfaces on the network side. Such triggering decision can be based on e.g. type of service, CBR, distance to receiving UE, number of UEs in the group (of SL groupcast), or the like.

In another example, the (sidelink) QoS monitoring can be triggered (locally) at/by the Tx UE itself. In this case, an application, i.e. application layer or function, inside the Tx UE can decide to perform and thus trigger (sidelink) QoS monitoring. Such triggering decision can be based on e.g. type of service, CBR, distance to receiving UE, number of UEs in the group (of SL groupcast), or the like. Here, an original or initial trigger/request may also come from an application server in the network, but such original or initial trigger/request goes to the Tx UE not via the serving network but directly via an application interface from the application server to the application client on the Tx UE side.

In operation S210 shown in FIG. 2, the Tx UE, i.e. the selected terminal device, receives a request for (sidelink) QoS monitoring of at least one target KPI (as an example of the QoS metric's to be monitored) for unicast/groupcast over SL with a specified QoS profile (representing the targeted QoS profile for monitoring) from the serving network entity. As mentioned above, the illustrated example assumes that the (sidelink) QoS monitoring is triggered and initiated by the serving network (either at the serving network entity, e.g. gNB, or via an application server), but the (sidelink) QoS monitoring can equally be triggered and initiated by the Tx UE (either directly or via an application server), wherein in the latter case the request would be locally/internally received from the application layer or function.

Generally, the QoS monitoring procedure may be coupled with or decoupled from actual unicast/groupcast data over SL (e.g. in the determination operation describe below). Hence, the Tx UE may decide (as part of a QoS monitoring enforcement scheme) whether to de-/couple the QoS monitoring procedure to be performed with respect to actual unicast/groupcast data over SL depending on presence or absence and/or QoS profile of an ongoing unicast/groupcast service (of the Tx UE) and the specified QoS profile of the requested QoS monitoring.

In case of a coupling decision (e.g. when the Tx UE has an ongoing SL unicast/groupcast service with the same QoS profile as the specified QoS profile), QoS monitoring messages may be exchanged using a traffic pattern of the actual unicast/groupcast data of the ongoing SL unicast/groupcast service. Namely, QoS monitoring messages (namely, probe or test packets/messages) for the targeted SL QoS flow(s) and/or RB service(s) according to the specific QoS profile can be selected or generated and transmitted using such traffic pattern. Namely, the probe or test packets/messages can either be specifically generated or selected from existing/ongoing traffic packets/messages. In any case, the generated or selected packets/messages can be identified or marked as probe or test packets/messages. For example, in data packets selected as probe or test packets, some indication information bits (e.g. one bit indication to indicate the data packet is also used as the probe/test packet for QoS monitoring) can be introduced in the packet header (e.g. PDCP packet header, and further information for QoS monitoring can be provided by control plane (e.g. RRC) signaling between Tx to Rx UE (as outlined below e.g. for PDCP C-PDU). Otherwise, in case of a decoupling decision (e.g. when the Tx UE has no ongoing SL unicast/groupcast service with the same QoS profile as the specified QoS profile), any QoS monitoring messages may be exchanged using a traffic pattern (which may be defined) based on a configuration in the request.

The request may include a configuration of one or more SL QoS flow(s) and/or RB service(s) for the QoS monitoring procedure. This configuration specifies a traffic pattern which may be used for exchanging QoS monitoring messages in a decoupling case. Namely, probe or test messages for the targeted SL QoS flow(s) and/or RB service(s) can be generated and transmitted using such traffic pattern. That is, while the traffic pattern of the ongoing SL unicast/groupcast service can be used for probe or test packets/messages for a coupling case, a specific/dedicated traffic pattern for QoS monitoring can be configured for a decoupling case (i.e. a case in which a configuration (in the request) specifies not to use actual data packages).

Hence, the configuration of/in the request causes to use actual data messages/packets of an ongoing SL unicast/groupcast service (thus 'indirectly' defining an applicable traffic pattern) or 'directly' defines an applicable traffic pattern. The traffic pattern may be given by, e.g., a QoS monitoring time interval, an average inter-packet arrival interval, or the like.

The request may include a resource allocation for the requested QoS monitoring, i.e. QoS monitoring messages to be exchanged over SL. On the one hand, such resource allocation may be or include an indication of resources for exchanging the QoS monitoring messages. These resources may include either only resources for transmitting QoS monitoring request messages to the Rx UE/s or both resources for transmitting QoS monitoring request messages from the Tx UE to the Rx UE/s and resources for transmitting QoS monitoring response messages from the Rx UE/s to the Tx UE. In the latter case, i.e. when including/indicating resources for a corresponding Rx UE/s to respond to the Tx UE, this means that the Tx UE passes the allocated resources to the Rx UE/s over SL. On the one hand, such resource allocation may be or include an indication of a resource allocation mode to be used for allocating resources for exchanging the QoS monitoring messages, namely which of resource allocation modes (i.e. network scheduling mode known as Mode 1 or autonomous selection mode known as Mode 2) shall be used for the QoS monitoring procedure, without actual resources provided.

In operation S220 shown in FIG. 2, the Tx UE, i.e. the selected terminal device, based on the received request, determines a QoS monitoring procedure over SL for the specified QoS profile, which is to be performed with at least one targeted corresponding Rx UE. In this determination operation, a scheme for enforcing QoS monitoring over SL in collaboration with the at least one targeted corresponding Rx UE is decided.

In this regard, the Tx UE may decide (as part of the QoS monitoring enforcement scheme) which devices are to be involved/addresses as the targeted Rx UE/s. Such decision, which is based on the request from the serving network entity (which is why it is influenced by the serving or controlling network/entity accordingly), may be based e.g. on the targeted (service) area for monitoring, the specified QoS profile, the (properties of) devices with which the Tx UE has an ongoing connection, session, communication, service, etc., the type of ongoing connection, session, communication, service, etc., or the like. Further, the Tx UE may decide (as part of the QoS monitoring enforcement scheme) whether the QoS monitoring procedure is to be performed in a connection-oriented or connectionless manner, and/or whether or not a setup operation is required for exchanging the QoS monitoring messages (i.e. for carrying out the QoS monitoring enforcement scheme). Any one of these decisions may be based e.g. on one or more of the specified QoS profile, the at least one target QoS metric or KPI, whether or not the Tx UE has an ongoing unicast/groupcast service over SL and, if so, whether the ongoing unicast/groupcast service is of the same QoS profile as the specified QoS profile.

In operation S230 shown in FIG. 2, the Tx UE, i.e. the selected terminal device, initiates/performs the setup operation with the at least one targeted corresponding Rx UE, if the setup operation is decided to be required as a result of the determination operation. The setup operation may be for setting up a connection (session) with the at least one targeted corresponding Rx UE in accordance with at least one QoS flow and/or at least one RB service based on the request received from the serving network.

Exemplary details of the determination and setup operations are described with reference to FIG. 4.

Figure 4:
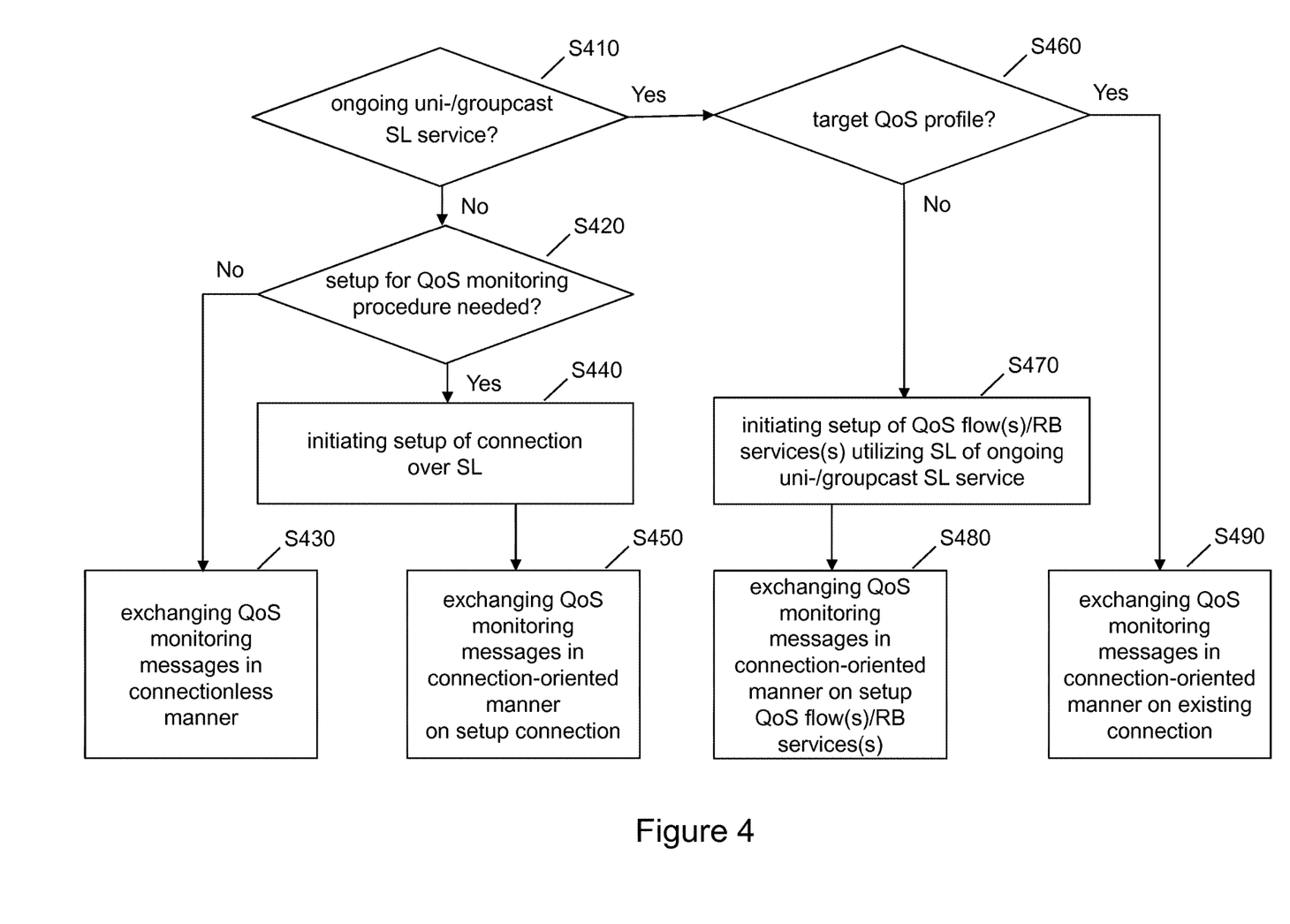
FIG. 4 shows a flowchart illustrating an example of a process according to at least one exemplifying embodiment.

FIG. 4 shows a flowchart illustrating an example of a process according to at least one exemplifying embodiment, namely the process of the determination and setup operations in operations S210 and S220 of FIG. 2.

In the exemplary process as illustrated in FIG. 4, presence/absence of an ongoing unicast/groupcast service is detected, i.e. it is decided whether or not the Tx UE has an ongoing unicast/groupcast service over SL (S410).

In case of NO in S410, i.e. when there is no ongoing unicast/groupcast service over SL, the need for a setup operation is detected, i.e. it is decided whether or not a setup operation is required for exchanging the QoS monitoring messages with the at least one targeted corresponding Rx UE or, stated in other words, whether not setting up a unicast/groupcast connection (session) over SL is needed or not (S420). For example, if the specified QoS profile may be provided using SL with or without feedback control on the radio access level and the at least one target QoS metric or KPI is other than the SL setup latency, the Tx UE may opt for using connectionless message exchange, which does not need connection (session) setup nor feedback control on the radio access level, for more flexibility and less overhead. In case of NO in S420, i.e. when a setup operation is not required, the QoS monitoring messages are exchanged with the at least one targeted corresponding Rx UE in a connectionless manner (S430), which will be accomplished in the context of the subsequent operation of performing the QoS monitoring procedure, as described below. In case of YES in S420, i.e. when a setup operation is required, the Tx UE initiates/performs a required setup operation for a unicast/groupcast connection (session) enabling message exchange with the specified QoS profile (S440). In this regard, the Tx UE may initiate/perform a SL unicast/groupcast connection setup with one or more corresponding Rx UEs consisting of target QoS flow(s) and/or RB service(s) as indicated in the request. The Tx UE, along the setup, may indicate to the one or more Rx UEs about the request of QoS monitoring based on the request received from the serving network. Thereupon, the QoS monitoring messages are exchanged, in a connection-oriented manner, with the at least one targeted corresponding Rx UE via the connection (session) resulting from the initiated/performed setup operation or, more specifically, the (setup) QoS flow/s) and/or RB service(s) of the setup connection (S450), which will be accomplished in the context of the subsequent operation of performing the QoS monitoring procedure, as described below.

In case of YES in S410, i.e. when there is an ongoing unicast/groupcast service over SL, the QoS profile of the ongoing unicast/groupcast service is detected, i.e. it is decided whether or not the ongoing unicast/groupcast service over SL has the same QoS profile as the specified QoS profile (S460). In case of NO in S460, i.e. when the ongoing unicast/groupcast service has a QoS profile different from the specified QoS profile, the Tx UE initiates/performs a required setup operation for a QoS flow(s) with the specified QoS profile and corresponding RB services, if needed, to enable message exchange with the specified QoS profile utilizing SL communication of the ongoing unicast/groupcast service (S470). Namely, in case the ongoing uncast/groupcast service over SL has a different QoS profile, the Tx UE may utilize the ongoing established SL (connection/session) as much as possible, at least for any target QoS metric or KPI other than SL setup latency. In this regard, the Tx UE may initiate/perform a setup with one or more corresponding Rx UEs consisting of target QoS flow(s) and/or RB service(s) as indicated in the request over the existing established unicast/groupcast SL. The Tx UE, along the setup, may indicate to the one or more Rx UEs about the request of QoS monitoring based on the request received from the serving network. Thereupon, the QoS monitoring messages are exchanged, in a connection-oriented manner, with the at least one targeted corresponding Rx UE via the QoS flow(s) and/or RB services(s) resulting from the initiated/performed setup operation or, more specifically, the setup QoS flow/s) and/or RB service(s) of the existing connection (S480), which will be accomplished in the context of the subsequent operation of performing the QoS monitoring procedure, as described below. In case of YES in S460, i.e. when the ongoing unicast/groupcast service has the same QoS profile as the specified QoS profile, the QoS monitoring messages are exchanged, in a connection-oriented manner, with the at least one targeted corresponding Rx UE via a connection (session) of the ongoing unicast/groupcast service, more specifically, the existing QoS flow/s) and/or RB service(s) of the existing connection (S490), which will be accomplished in the context of the subsequent operation of performing the QoS monitoring procedure, as described below. In this regard, the Tx UE may indicate to the one or more Rx UEs about the request of QoS monitoring based on the request received from the serving network.

In case of message exchange in S430, S450 and S480 the QoS monitoring procedure is or can be decoupled from actual unicast/groupcast data over SL, while in case of message exchange in S490 the QoS monitoring procedure is or can be coupled to actual unicast/groupcast data over SL. As mentioned above, the QoS monitoring messages are generated and exchanged using a dedicated/configured traffic pattern in case of decoupling, and the QoS monitoring messages are either generated or selected and exchanged using the traffic pattern of the coupled/ongoing communication.

It is to be noted that FIG. 4 illustrates an exemplary process for explanatory purposes, but the present disclosure is not restricted thereto, as various steps can be omitted, performed in a different order or in a difference sequence or merged (if feasible). For example, steps S410 and S460 can be merged.

Returning to the description of FIGS. 2 and 3, the Tx UE, i.e. the selected terminal device, performs the QoS monitoring procedure according to the preceding determination and setup results (e.g. the thus decided QoS monitoring enforcement scheme).

In operation S240 shown in FIG. 2, the Tx UE, i.e. the selected terminal device, generates and transmits QoS monitoring request messages over SL to the at least one targeted corresponding Rx UE. These QoS monitoring request messages include an indication about the requested QoS monitoring and can also be referred to as QoS monitoring enforcement messages, as they serve as a request to enforce a response from the one or more Rx UEs for the QoS monitoring purpose at the Tx UE or, stated in other words, they enforce the one or more Rx UEs to send corresponding responses to the Tx UE with the specified QoS profile.

For monitoring QoS metrics or KPIs or one or more QoS flow(s) and/or RB service(s), QoS monitoring enforcement messages may include information and/or instructions regarding desired/required QoS monitoring related configuration(s) and/or parameter(s) to be monitored and measured. For example, QoS monitoring enforcement messages may include one or more of identification of the targeted QoS flow or QoS profile, resource allocation information, resource mode, sequence number, CBR report, threshold/s, time duration/s, configured traffic pattern/s, and periodic, real-time or event-triggered monitoring indication/s, or the like.

In operation S250 shown in FIG. 2, the Tx UE, i.e. the selected terminal device, receives QoS monitoring response messages from the at least one targeted corresponding Rx UE (in response to the previously transmitted QoS monitoring request messages). Namely, the Tx UE receives the expected responses from the one or more Rx UEs, and the responses may also indicate which resource allocation mode is used by the respective Rx UE to send the response.

As indicated by a dashed line in FIG. 2 and noted in FIG. 3, the QoS monitoring request and response messages are exchanged based on or according to the applicable traffic pattern, as defined/configured by the configuration of/in the request received from the serving network. Namely, the QoS monitoring messages are exchanged over the sidelink communication with the specified QoS profile in accordance with the decided scheme.

In operation S260 shown in FIG. 2, the Tx UE, i.e. the selected terminal device, derives the at least one target QoS metric or KPI from transmitting/receiving information and/or properties of the QoS monitoring request and response messages. Namely, the Tx UE derives the at least one target QoS metric or KPI based on recorded information on the transmission(s) and reception(s) of the QoS monitoring messages, such as e.g. timing instances and missing responses. Then, the Tx UE, i.e. the selected terminal device, reports the derived at least one target QoS metric or KPI to the serving network entity from which the request has been received (or another device or entity defined/configured by the request).

The QoS monitoring procedure, i.e. the message exchange in operation S250 and S260 can be performed in a connection-oriented or connectionless manner, depending on the outcome of the preceding operations.

In case of message exchange in S450, S480 or S490 according to FIG. 4, a connection-oriented approach is adopted. Here, the Tx UE may use, e.g., individual SL PDCP-C PDUs (which may equally be denoted as SL PDCP C-PDU) for the targeted QoS flow(s) and/or RB service(s) according to the defined/configured traffic pattern of the specified QoS flow (which, at least in case of S490, may be coupled with the actual unicast/groupcast data over SL). Any SL PDCP-C PDU may optionally comprise, for example, an identifier of the specified QoS flow or QoS profile and/or information on resource allocation for the expected response(s) (e.g. a specific mode with or without actual resources or indication that the Rx UE can use any mode and whether or not the Rx UE needs to indicate about the mode used in the response).

In case of message exchange in S430 according to FIG. 4, a connectionless approach is adopted. Here, the Tx UE may use, e.g., individual SL SP (applied for at least LTE SL) or SL RRC (applied for at least NR SL) messages for the targeted QoS flow(s) and/or RB service(s) according to the defined/configured traffic pattern of the specified QoS flow. Any SL SP message may optionally comprise, for example, an identifier of the specified QoS flow or QoS profile that the Rx UE needs to apply for sending the expected response (e.g. PPPP/PPPR/5QI), a sequence number and/or information on resource allocation for the expected response(s) (e.g. a specific mode with or without actual resources or indication that the Rx UE can use any mode and whether or not the Rx UE needs to indicate about the mode used in the response).

It is to be noted that, according to exemplifying embodiments, the above-described (variants of) message exchange options represent non-limiting examples, and the message exchange under the QoS monitoring procedure can be adapted and realized as appropriate in view of applicable requirements, conditions, use cases, or the like.

Especially (but not only) when using the connectionless approach, some (further) flexibility may be applied in that the Tx UE may be configured to determine/decide on using different messaging options. Besides the above options based on L2 or L3 signaling, options based on L1 and/or L2 signaling are conceivable, depending on the respective needs, conditions, parameters, or the like. Accordingly, the QoS monitoring messages may comprise messages and/or packets based on L1 and/or L2 and/or L3 signaling.

As an option based on L1 signaling, the QoS monitoring request(s) and the QoS monitoring response(s) may be messages and/or packets in the form of enhanced SCI (sidelink control information) on the PSCCH both from the Tx UE to the Rx UEs and from the Rx UE/s to the Tx UE. As another option based on L1 signaling, the QoS monitoring request(s) may be messages and/or packets in the form of enhanced SCI (sidelink control information) on the PSCCH both the Tx UE to the Rx UEs and the QoS monitoring response(s) may be messages and/or packets in the form of an acknowledgment on the PSFCH from the Rx UE/s to the Tx UE. As an options based on a combination of L2 and L1 signaling, the QoS monitoring request(s) and the QoS monitoring response(s) may be based on SL ARQ and/or HARQ with feedback control.

For example, L1-based message exchange (and a corresponding measurement and feedback approach) may be adequate for QoS monitoring of some QoS metrics or KPIs (such as e.g. availability and reliability) in a low-CBR scenario, while L2- or L3-based message exchange (and a corresponding measurement and feedback approach) may be more reassuring in a high-CBR scenario. Thus, different CBR thresholds may be incorporated in the decision-making for the QoS monitoring procedure (QoS monitoring enforcement scheme) as corresponding triggering conditions, potentially also in consideration of the QoS metrics or KPIs to be monitored.

For example, in case ARQ and/or HARQ with feedback control is adopted for an ongoing unicast/groupcast over SL, the QoS monitoring procedure for some QoS metrics or KPIs (such as e.g. latency and reliability), i.e. the message exchange (and a corresponding measurement and feedback approach) for them, may be based on ARQ and/or HARQ operation and performance. It is to be noted that URLLC may not be able to afford feedback control delay, and therefore this approach is not always applicable but may depend on the type of relevant service, the QoS metrics or KPIs to be monitored, or the like.

A mix of L1, L2 and L3 approaches may be considered in order to reduce overhead, depending on whether or not the QoS monitoring can be coupled with actual unicast/groupcast data over SL. For example, in case the QoS monitoring can rely on sufficiently frequent transmission and reception of actual unicast/groupcast data over SL of an ongoing unicast/groupcast service, L1-based message exchange (and a corresponding measurement and feedback approach) may be adopted in between two consecutive transmissions of actual data. In case the actual unicast/groupcast data over SL of an ongoing unicast/groupcast service is not sufficiently frequent, L2- or L3-based message exchange (and a corresponding measurement and feedback approach) may be adopted in between two consecutive transmissions of actual data.

Accordingly, the QoS monitoring procedure may be implemented on/via different protocols and/or protocol levels. For example, the QoS monitoring procedure may be originated and terminated on SL SP level (which may be applied for at least LTE SL), SL RRC level (which may be applied for at least NR SL) or PDCP level (which may be applied for both LTE SL and NR SL). Optionally, the QoS monitoring procedure may be based on SL RRC, MAC or L1 SCI signaling in view of the specified QoS profile and/or QoS metrics or KPIs to be monitored. Hence, i.e. by a suitable choice of protocol and/or protocol level, the QoS monitoring can be realized as close to the application level as possible for monitoring corresponding QoS metrics or KPIs.

In view of the above, according to exemplifying embodiments, the Tx UE may be configured to decide (e.g. as at least part of the QoS monitoring enforcement scheme) about the signaling and/or message/packet type for the QoS monitoring messages based on one or more of the at least one target QoS metric or KPI, a channel busy ratio (of the sidelink or sidelink communication), service and/or QoS demands, de-/coupling of the QoS monitoring procedure with actual unicast/groupcast data over SL communication, or the like.

With respect to the reporting of the QoS monitoring results, different approaches may be adopted and realized as appropriate in view of applicable requirements, conditions, use cases, or the like.

For example, the RX UE/s may be configured to report measured parameters to the Tx UE in a collective report at a certain preconfigured time period, e.g. after every 4-5 transmissions belonging to a specific session (i.e. QoS monitoring procedure), at least for the same type of sidelink or sidelink communication (e.g. for LTE SL or 5G/NR SL). The Tx UE saves the Tx parameters and computes when the Rx UE/s sends the report. This will help in reducing signaling overhead. Such approach is different from the conventional monitoring of Uu L2 measurement that is done on per QCI basis.

When the Tx UE is in IDLE or INACTIVE state and has actual unicast/groupcast over SL in Mode 2, the Tx UE may be configured to perform QoS monitoring of the actual unicast/groupcast SL in Mode 2. In this case, the Tx UE may e.g. be configured to report on QoS monitoring upon initiating a switching from Mode 2 to Mode 1 or as part of logged measurement and reporting as designed for IDLE or INACTIVE UE measurement and reporting.

Generally, the reporting from the Tx UE can be performed over any suitable (and existing) interface, e.g. Uu interface. For example, in case of LTE and 5G/NR, the reporting can thus be performed via LTE Uu interface or via 5G/NR Uu interface, whichever is active.

When the Tx UE is in CONNECTED or ACTIVE state and has actual unicast/groupcast over SL, the Tx UE may be configured to perform QoS monitoring of the actual unicast/groupcast SL in real time. In this case, the Tx UE may e.g. be configured to report on QoS monitoring when the Tx UE requests for a new resource allocation or upon a release of Mode 1 resources.

The report from the Tx UE to the serving network may include, for example, one or more of the following:

- QoS profile ID of the unicast/groupcast service (which may be optional for Tx UE in Mode 1, as the serving network may be aware of this before)
- QoS metric(s) or KPI(s) associated with the QoS profile, such as e.g. latency, reliability and availability (wherein the latter may include average latency of successful establishment/reestablishment and number of reestablishments needed for the service session due to SL failures or unexpected service interruptions and the average setup latency)
- CBR over relevant resource pool(s) or carrier(s) while conducting the services and QoS monitoring from either Tx UE or Rx UE perspective, assuming that Rx UE may indicate such CBR to Tx UE over SL.

By virtue of exemplifying embodiments of the present disclosure, as evident from the above, QoS monitoring for unicast/groupcast over sidelink communication, which may preferably be capable of enhancing support of unicast/groupcast services over sidelink communication, can be enabled/realized.

As explained above, the present disclosure provides a technique to enable QoS monitoring of some QoS metrics or KPIs for enhancing support of unicast/groupcast over SL. The thus disclosed QoS monitoring technique is (effective) for (sidelink) QoS monitoring purpose regardless of whether or not there are ongoing SL unicast/groupcast communications in the targeted service area. This way the network or the controlling entity (e.g. Tx UE, MEC etc.) can also get a global view of the QoS that the unicast/groupcast services are experiencing over the SL in a specific area. For example, this can help the network to perform optimized RRM procedures more effectively and efficiently to minimize the OPEX. Therefore, the QoS on sidelink can be monitored and provided with a finer granularity (as compared with conventional techniques). Furthermore, based on the collected monitoring reports, the network or the controlling entity may perform several actions such as adaptation of gNB scheduler behavior, RRM (resource allocation/bandwidth allocation, MCS), congestion control, admission control, prediction, computing QoE, advance notification, power control, in-device coexistence issues, or the like. The information collected via the thus disclosed QoS monitoring technique can also facilitate and assist in adjustment of application behavior as well as prediction of potential QoS change.

The present disclosure presents a flexible and adaptive QoS monitoring procedure (or session) for a selected UE to perform measurement and reporting on at least one specified QoS metric or KPI for unicast/groupcast over SL. The QoS monitoring procedure can be coupled or decoupled with actual unicast/groupcast data over SL of the selected UE. The selected UE is configured to initiate the procedure and acting as the Tx UE for unicast/groupcast SL in the procedure. The procedure enforces one or more targeted UEs which receive individual data packets or messages specific to the procedure from the Tx UE to send corresponding responses to the Tx UE with the target QoS profile. The Tx UE may then derive the at least one specified QoS metric or KPI for the reporting purpose based on relevant recorded parameters of individual data packets or messages sent and corresponding responses received at the Tx UE. In this regard, it is to be noted that SL in LTE and NR is oriented toward the Tx UE. The serving network of the Tx UE may not have control over Rx UE/s, as Rx UE/s may belong to a different serving network. Furthermore, SL has different modes of resource allocation, e.g., based on either network scheduling Mode 1 or autonomous UE selection Mode 2. Then, unicast/groupcast over SL can be realized with or without feedback control—HARQ or ARQ—on the radio access level.

Depending on the purpose or situation, each of the above configurations may be preferable. Accordingly, there is provided a technique for configuring measurements and for collecting the feedback in a generic and adaptive manner for a minimized protocol overhead, an increased flexibility, or the like. By way of such configurability, which is particularly exhibited e.g. in operations S120 and S130 of FIG. 1, operations S220 to S250 of FIG. 2 and the process of FIG. 4, a flexible and adaptive QoS monitoring procedure (or session) can be embodied with a finer granularity (as compared with conventional techniques).

By way of example, the QoS monitoring technique according to the present disclosure is applicable and effective for facilitating/enhancing 3GPP NR V2X support in Rel'17 and beyond. Specifically, the QoS monitoring technique according to the present disclosure is applicable and effective for addressing corresponding key issues, as described in chapter 5.15.1 of 3GPP TR 23.786 V16.1.0 (2019-06) and chapter 5.2 of 3GPP TR 23.795 V16.1.0 (2018-12).

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 5 and 6, while for the sake of brevity reference is made to the detailed description of respective corresponding configurations/setups, schemes, methods and functionality, principles and operations according to FIGS. 1 to 4.

Figure 5:
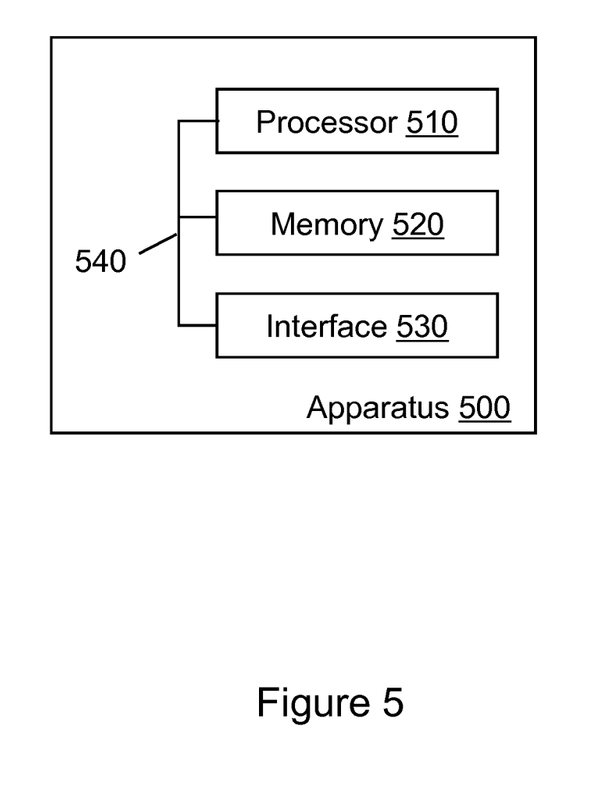
FIG. 5 shows a schematic diagram illustrating an example of a (constructional) structure of an apparatuses according to at least one exemplifying embodiment.
Figure 6:
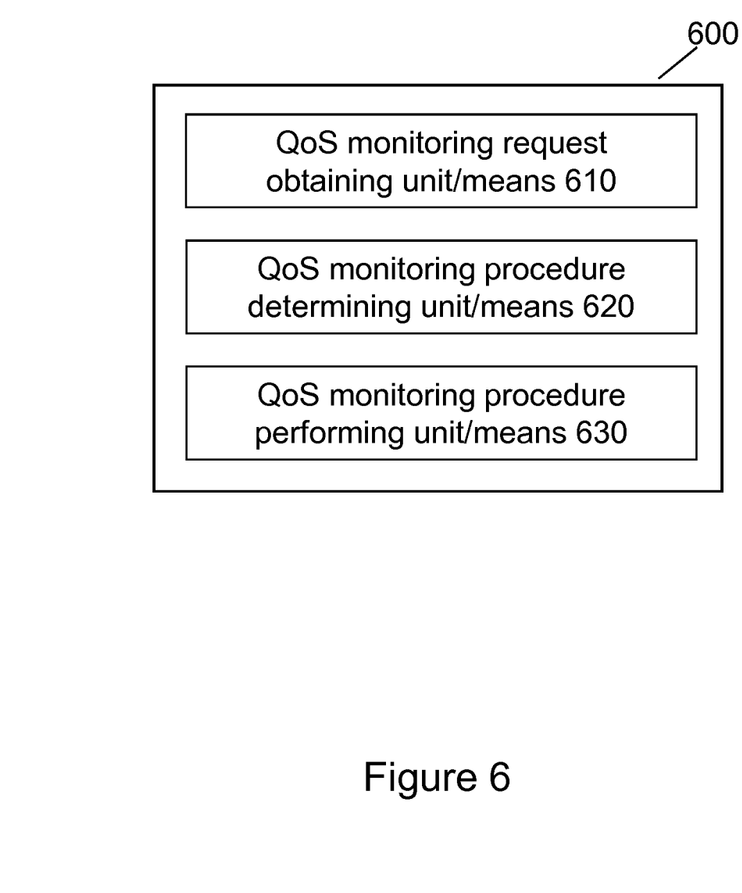
FIG. 6 shows a schematic diagram illustrating an example of a (functional) structure of an apparatuses according to at least one exemplifying embodiment.

In FIGS. 5 and 6, the blocks are basically configured to perform respective methods, procedures and/or functions as described above. The entirety of blocks are basically configured to perform the methods, procedures and/or functions as described above, respectively. With respect to FIGS. 5 and 6, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 5 and 6, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 5 shows a schematic diagram illustrating an example of a (constructional) structure of an apparatus according to at least one exemplifying embodiment. Herein, an apparatus can represent a device or a function, i.e. a structural device implementing a specific network element, entity or function or the functionality thereof as such.

As indicated in FIG. 5, according to at least one exemplifying embodiment, an apparatus 500 may comprise at least one processor 510 and at least one memory 520 (and possibly also at least one interface 530), which may be operationally connected or coupled, for example by a bus 540 or the like, respectively.

The processor 510 and/or the interface 530 of the apparatus 500 may also include a modem or the like to facilitate communication over a (hardwire or wireless) link, respectively. The interface 530 of the apparatus 500 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 530 of the apparatus 400 is generally configured to communicate with at least one other apparatus, device, node or entity (in particular, the interface thereof).

The memory 520 of the apparatus 500 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 520 of the apparatus 500 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 500 is suitable for use in practicing one or more of the exemplifying embodiments, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to at least one exemplifying embodiment, the thus illustrated apparatus 500 may represent or realize/embody a (part of a) a terminal device (e.g. a UE) in/of a mobile communication system, such as a Tx UE as described above. Hence, the apparatus 500 may be configured to perform a procedure and/or exhibit a functionality and/or implement a mechanism, as described for the Tx UE, in any one of FIGS. 1 to 4.

Accordingly, the apparatus 500 may be caused or the apparatus 500 or its at least one processor 510 (possibly together with computer program code stored in its at least one memory 520), in its most basic form, is configured to obtain a request for quality-of-service (QoS) monitoring for unicast/groupcast over sidelink communication with a specified quality-of-service (QoS) profile, which indicates at least one target quality-of-service (QoS) metric to be monitored, determine a quality-of-service (QoS) monitoring procedure on the basis of the obtained request in view of presence or absence and/or quality-of-service (QoS) profile of an ongoing unicast/groupcast service, wherein a scheme for enforcing quality-of-service (QoS) monitoring over sidelink communication in collaboration with at least one unicast/groupcast receiving-side device is decided, and perform the determined quality-of-service (QoS) monitoring procedure, wherein quality-of-service (QoS) monitoring messages are exchanged with the at least one unicast/groupcast receiving-side device over the sidelink communication with the specified quality-of-service (QoS) profile in accordance with the decided scheme and the at least one target quality-of-service (QoS) metric is derived based on the message exchange.

As mentioned above, an apparatus according to at least one exemplifying embodiment may be structured by comprising respective units or means for performing corresponding operations, procedures and/or functions. For example, such units or means may be implemented/realized on the basis of an apparatus structure, as exemplified in FIG. 5, i.e. by one or more processors 510, one or more memories 520, one or more interfaces 530, or any combination thereof.

FIG. 6 shows a schematic diagram illustrating an example of a (functional) structure of an apparatus according to at least one exemplifying embodiment.

As shown in FIG. 6, an apparatus 600 according to at least one exemplifying embodiment may represent or realize/embody a (part of a) a terminal entity (e.g. a UE) in/of a mobile communication system. Specifically, the apparatus 600 may for example be a (part of a) a UE like the Tx UE as described above. Such apparatus may comprise (at least) a unit or means (denoted as QoS monitoring request obtaining unit/means 610) for obtaining a request for quality-of-service (QoS) monitoring for unicast/groupcast over sidelink communication with a specified quality-of-service (QoS) profile, which indicates at least one target quality-of-service (QoS) metric to be monitored, a unit or means (denoted as QoS monitoring procedure determining unit/means 620) for determining a quality-of-service (QoS) monitoring procedure on the basis of the obtained request in view of presence or absence and/or quality-of-service (QoS) profile of an ongoing unicast/groupcast service, wherein a scheme for enforcing quality-of-service (QoS) monitoring over sidelink communication in collaboration with at least one unicast/groupcast receiving-side device is decided, and a unit or means (denoted as QoS monitoring procedure performing unit/means 630) for performing the determined quality-of-service (QoS) monitoring procedure, wherein quality-of-service (QoS) monitoring messages are exchanged with the at least one unicast/groupcast receiving-side device over the sidelink communication with the specified quality-of-service (QoS) profile in accordance with the decided scheme and the at least one target quality-of-service (QoS) metric is derived based on the message exchange.

For further details regarding the operability/functionality of the apparatuses (or units/means thereof) according to exemplifying embodiments, reference is made to the above description in connection with any one of FIGS. 1 to 4, respectively.

According to exemplifying embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present disclosure, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing flexible and adaptive QoS monitoring for unicast/groupcast over sidelink communication, which may preferably be capable of enhancing support of unicast/groupcast services over sidelink communication. Such measures exemplarily comprise obtaining a request for QoS monitoring for unicast/groupcast over sidelink communication with a specified quality-of-service profile, which indicates at least one target QoS metric to be monitored, determining a QoS monitoring procedure, wherein a scheme for enforcing QoS monitoring over sidelink communication in collaboration with at least one unicast/groupcast receiving-side device is decided, and performing the QoS monitoring procedure, wherein QoS monitoring messages are exchanged with the at least one unicast/groupcast receiving-side device over the sidelink communication with the specified QoS profile in accordance with the decided scheme and the at least one target quality-of-service metric is derived based thereon.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP 3rd Generation Partnership Project
5G 5th Generation
5QI 5G QoS Indicator
ARQ Automatic Repeat Request
CBR Channel Busy Ratio
E2E End-to-End
eLTE evolved LTE
gNB Next generation NodeB
HARQ Hybrid Automatic Repeat Request
(I)IoT (Industrial) Internet of Things
KPI Key Performance Indicator
L1/2/3 Layer 1/2/3
LTE Long Term Evolution
MAC Medium Access Control
MEC Mobile Edge Computing
MCS Modulation and Coding Scheme
NR New Radio
OPEX Operational Expenditure
PER Packet Error Rate
QCI QoS Class Identifier
QoE Quality of Experience
QoS Quality of Service
SL SideLink
SL SP Sidelink Signaling Protocol
PDCP Packet Data Convergence Protocol
PPPP ProSe Per-Packet Priority
PPPR ProSe Per-Packet Reliability
PSFCH Physical Sidelink Feedback Channel
PSCCH Physical Sidelink Control Channel
RB Radio Bearer
RRC Radio Resource Control
RRM Radio Resource Management
Rx Reception/Receiving/Receiving-side
Tx Transmission/Transmitting/Transmitting-side
UE User Equipment
URLLC Ultra Reliable Low Latency Communication
V2X Vehicle-to-Everything

The invention claimed is:

1. An apparatus comprising
at least one processor and at least one memory including a computer program code,
wherein the at least one memory and the computer program code are configured, with the at least one processor, to cause the apparatus to perform at least the following:
  obtaining a request for quality-of-service monitoring for unicast/groupcast over sidelink communication with a specified quality-of-service profile, which indicates at least one target quality-of-service metric to be monitored,
  determining a quality-of-service monitoring procedure on the basis of the obtained request in view of presence or absence and/or quality-of-service profile of an ongoing unicast/groupcast service, wherein a scheme for enforcing quality-of-service monitoring over sidelink communication in collaboration with at least one unicast/groupcast receiving-side device is decided, wherein, as at least part of the scheme, it is decided whether the determined quality-of-service monitoring procedure is coupled with or decoupled from actual unicast/groupcast data over sidelink communication, wherein the determining includes:
    detecting presence of an ongoing unicast/groupcast service with a quality-of-service profile different from the specified quality-of-service profile, and
    initiating a setup operation for at least one quality-of-service flow and at least one radio bearer service enabling message exchange with the specified quality-of-service profile utilizing sidelink communication of the ongoing unicast/groupcast service,
  wherein quality-of-service monitoring messages are exchanged via the at least one quality-of-service flow and the at least one radio bearer service resulting from the initiated setup operation,
  wherein, if the setup operation is decided to be required, the determining comprises initiating a setup operation for a connection enabling message exchange with the specified quality-of-service profile,
  wherein, if the setup operation is decided to be not required, the quality-of-service monitoring messages are exchanged in a connectionless manner, and
  wherein the setup operation is for setting up a connection with the at least one unicast/groupcast receiving-side device in accordance with at least one quality-of-service flow and at least one radio bearer service based on the request; and
performing the determined quality-of-service monitoring procedure, wherein the quality-of-service monitoring messages are exchanged with the at least one unicast/groupcast receiving-side device over the sidelink communication with the specified quality-of-service profile in accordance with the decided scheme and the at least one target quality-of-service metric is derived based on the message exchange,
wherein the request includes a configuration of a quality-of-service flow and at least one radio bearer service for the requested quality-of-service monitoring for unicast/groupcast over sidelink communication, and
wherein the request includes a resource allocation for the requested quality-of-service monitoring over sidelink communication, wherein the resource allocation includes:
  an indication of resources for exchanging the quality-of-service monitoring messages, including either resources for transmitting quality-of-service monitoring request messages to the at least one unicast/groupcast receiving-side device or resources for transmitting quality-of-service monitoring request messages to the at least one unicast/groupcast receiving-side device and resources for transmitting quality-of-service monitoring response messages from the at least one unicast/groupcast receiving-side device, and
  an indication of a resource allocation mode to be used for allocating resources for exchanging the quality-of-service monitoring messages, wherein the quality-of-service monitoring messages include:
    request and response messages and packets in a form of packet data convergence protocol (PDCP) control packet data units sent on sidelink data radio bearer to and from the at least one unicast/groupcast receiving-side device;
    request and response messages and packets in a form of sidelink signaling protocol messages and packets to and from the at least one unicast/groupcast receiving-side device;
    request and response messages and packets in a form of sidelink radio resource control signaling messages and packets to and from the at least one unicast/groupcast receiving-side device;
    request and response messages and packets in a form of enhanced sidelink control information sent on a Physical Sidelink Control Channel to and from the at least one unicast/groupcast receiving-side device;
    request messages and packets in a form of enhanced sidelink control information on the Physical Sidelink Control Channel to the at least one unicast/groupcast receiving-side device and response messages and packets in the form of an acknowledgment on a Physical Sidelink Feedback Channel; and
    request and response messages and packets based on Automatic Repeat Request or Hybrid Automatic Repeat Request.

* * * * *